Aug. 18, 1936.    H. ADELMANN    2,051,360

HAM BOILER

Filed July 31, 1931

INVENTOR
*Hans Adelmann,*
BY
ATTORNEY

Patented Aug. 18, 1936

2,051,360

UNITED STATES PATENT OFFICE 2,051,360

HAM BOILER

Hans Adelmann, New Rochelle, N. Y., assignor to Ham Boiler Corporation, Port Chester, N. Y., a corporation of Delaware Application July 31, 1931, Serial No. 554,214

10 Claims. (Cl. 100—57)

My present invention relates generally to containers, and has particular reference to ham boilers.

It is a general object of my invention to provide an improved ham boiler of the type wherein a container is adapted to receive the ham to be boiled and wherein a cover is provided in association with means for exerting a constant pressure upon the cover and hence upon the ham beneath the cover so as to compress the latter during the boiling thereof.

The type of device to which my invention has reference has for its object not merely the boiling of a ham but also the compression of the latter into a predetermined desired shape, usually rectangular. Usually, the entire ham boiler is inserted into a boiling medium such as water and is permitted to remain therein until the ham is completely boiled and compressed, after which the ham is removed and may be packed and shipped in any convenient manner to provide the wellknown type of rectangular ham loaf for delicatessen stores, hotels, and the like.

Since a ham has a tendency to shrink during the boiling thereof, one of the main problems confronting the designing of a suitable and efficient ham boiler lies in the provision of means for preserving the full weight of the ham. It is a particular object of my present invention to provide a boiler which reduces shrinkage of the ham to a minimum.

Another general object of my invention is to provide a boiler which fulfills its contemplated functions without in the least impairing the natural constituency, quality, and character of the ham that is treated. More especially, it is an object of my invention to provide a device which will preserve the natural juices of the ham and prevent escape thereof during the boiling procedure.

A further object of my invention is to provide a boiler which prevents any contact between the ham and the boiling medium.

Further objects and advantages will appear after this specification has been read, and lie in the general arrangement and construction of parts whereby the boiling and compressive treatments may be efficiently and reliably carried out in a simple and expeditious manner and by means of a boiler of simplified and inexpensive construction.

One of the main features of my invention lies in the provision of a cover for the ham container, in combination with a liquid-tight sealing means for the cover, which not only preserves the ham juices and prevents undesired contact with the boiling medium, but which at the same time permits the cover to move in the contemplated manner to exert the continuous and desired pressure upon the ham during the boiling and shrinkage thereof.

Another feature of my invention lies in the provision of an improved means for exerting a constant and substantially uniform pressure upon the cover under all conditions.

I achieve the foregoing objects and advantages, and such other objects and advantages as may hereinafter appear or be pointed out, in the manner illustratively exemplified in the accompanying drawing, wherein—

Figure 1:
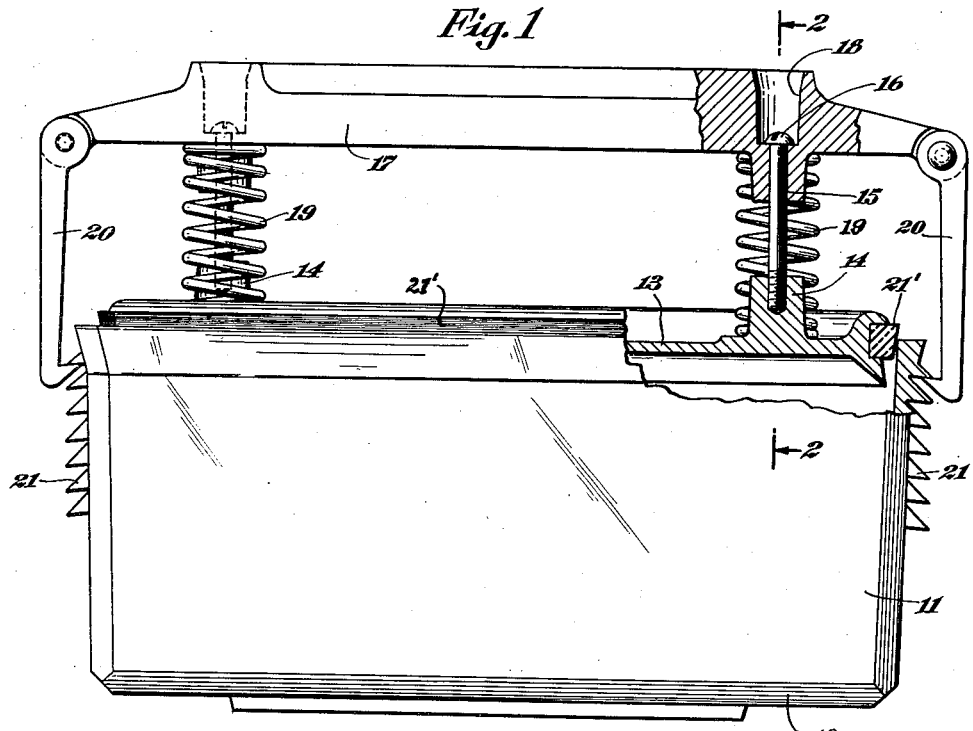
Figure 1 is a plan view of a ham boiler embodying the features of my present invention, with parts broken away and shown in section.

In the drawing, I have illustrated a substantially rectangular container of rigid material, preferably metal, and provided with a bottom wall 10 and upstanding side walls 11. This container is adapted to receive and accommodate a ham.

Applicable to the open top of the container to overlie and rest upon the ham within the container is a rigid cover 13 which is also of suitable metal, such as cast aluminum, tinned steel, or stainless steel, by way of example and which fits substantially closely, but not entirely snugly, within the open top of the container. The cover is provided on its top surface with a pair of bosses 14, from each of which a stud or pin 15 extends, terminating in a head 16. The upper end of the stud is slidably accommodated within a suitable bore provided in a yoke 17 extending across the entire boiler and provided with countersunk openings 18 within which the heads 16 are accommodated.

Figure 2:
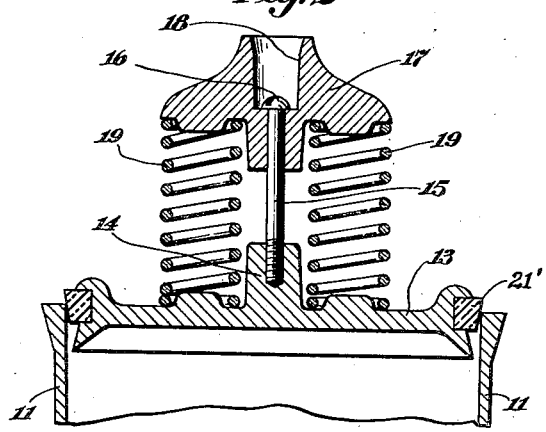
Figure 2 is a cross-sectional view taken substantially along the line 2—2 of Figure 1.

In the type of ham boiler to which my invention relates, yieldable pressure means are provided between the yoke 17 and the cover 13 to exert a constant downward pressure on the latter; and in the form of Figures 1 and 2 I have shown a pair of compression springs 19 on each side of each stud 15.

At the ends of the yoke 17 are pivoted links or hooks 20 which extend downwardly and are adapted to engage with the sets of rack teeth 21 formed upon the opposite side walls of the container.

After the ham has been accommodated within the container, the yoke 17, and the cover 13 associated therewith, are applied to the container so that the cover 13 rests upon the ham. Pressure is then exerted upon the yoke 17 so as to force the hooks 20 into secure engagement with one of the teeth 21, and this engagement firmly secures the yoke in association with the container. When this is accomplished, the springs 19 will have been compressed, as a result of which the heads 16 of the studs 15 will be disposed above the floors of the countersunk openings 18. In other words, the cover 13 will be held downwardly by a yielding yet constant spring pressure. As the ham shrinks during the boiling thereof, the springs 19 will move the cover downwardly or inwardly into the container so that it will always rest upon the ham and exert a compressive force thereon.

In accordance with my present invention, a sealing means for the container is provided whereby the ham juices are preserved within the container while at the same time the contemplated movements and adjustments of the cover 13 are permitted to take place in the manner described. In the embodiment herein illustrated, the cover is provided on its periphery with a groove, preferably rectangular; and a sealing ring 21' is mounted in this groove and adapted to engage snugly and in a liquid-tight manner, and yet slidably, with the adjacent side walls 11 of the container.

Although my invention is not restricted to any particular type of sealing ring, I prefer to employ a ring of integral construction and of resilient material such as rubber or the like. I further prefer to shape the ring in such a way that it tapers downwardly in the manner illustrated in Figures 1 and 2. As a result, the cover assumes the position of Figures 1 and 2 when it is first applied; but when the yoke 17 is pressed downwardly, the cover is forced downwardly into the upper marginal portion of the container and the ring 21' is jammed into sealing position between the periphery of the cover and the walls of the container. During the boiling, the springs 19 are free to continue their contemplated constant pressure upon the cover and to adjust the cover downwardly as the ham shrinks by virtue of the fact that the sealing ring 21' permits movement of the cover with respect to the container without destroying the liquid-tight seal. The tapered construction more readily permits this movement to take place inwardly and less readily permits the cover to be moved outwardly, this being of advantage for the reason that the possible formation of vapor pressures within the container may tend to counteract the contemplated inward pressure of the springs 19.

Furthermore, it is possible that the tapered construction permits the escape of some of the interior vapors, should the pressure become too great, without impairing the liquid-tight association of the cover and container.

When the boiling procedure has been completed, it is a relatively simple matter to remove the cover, despite the arrangement thereon of the sealing means, for the reason that the hooks 20 are forcibly disengaged from the teeth 21 and an upward force may then be supplied to the yoke 17, this force being transmitted to the cover through the studs 15.

Figure 3:
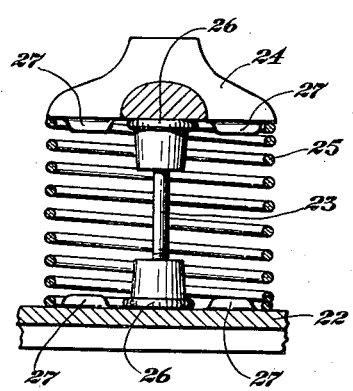
Figure 3 is a view similar to Figure 2, illustrating a modification.
Figure 4:
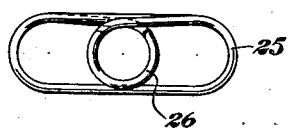
Figure 4 is a plan view of the spring illustrated in Figure 3.

In Figures 3 and 4, I have illustrated a modified type of spring pressure means whereby I have shown a more uniform and efficient pressure to be effected. The cover 22 is provided with the upstanding stud 23 which engages, as hereinbefore described, within a yoke 24. Instead of providing a spring on each side of the stud 23, however, I employ a single elliptical spring 25 which extends completely around the stud 23 and is provided at its opposite ends with the substantially circular portions 26 which engage around the bosses on the yoke 24 and the cover 22. This engagement of the portions 26 with the bosses tends to hold the elliptical spring in proper position, and, if desired, additional bosses 27 may be provided for this purpose.

It will be understood, of course, that the use by me of the term "ham" both in the specification and in the appended claims is not intended to restrict the invention to the treatment of this particular type of meat, since the invention may be used with equal facility upon other types of meat, whether they be hams or not. The term "ham" has been used merely for the sake of convenience to designate the particular body or mass which is to be accommodated within the boiler and treated in the manner described.

It will be understood further that my sealing means need not necessarily be an integral ring or annulus of rubber or the like and that the equivalent of the ring illustrated may be provided, if desired, in the form of separate pieces or elements or individual complementary inserts or the like. Also, although I prefer the tapered integral construction illustrated it may be found that other shapes and cross-sectional configurations are equally satisfactory, and I do not intend to restrict my invention to the specific details of shape, size, or arrangement herein described and illustrated. Nor is my invention restricted to containers which are substantially rectangular.

In general, it will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a ham boiler, a container having a base and upstanding side walls and adapted to accommodate a ham to be boiled and compressed, a cover adapted to fit into the open top of the container to overlie and rest upon said ham, means for yieldably and continuously exerting a balanced pressure upon the cover so as to compress the ham beneath it, and a sealing ring of resilient material mounted around the periphery of the cover, said ring being inwardly tapered so that inward movement of the cover under the action of said pressure means is more readily permitted than outward movement under the vapor pressures beneath the cover, whereby the ham is retained continuously under pressure during the boiling and shrinkage thereof while the ham juices are prevented from escaping during immersion of the boiler into a boiling medium when the pressure within the mold is not sufficient to distort said sealing ring.

2. In a ham boiler a container having a base and upstanding side walls and adapted to accommodate a recumbent ham to be boiled and compressed, a cover adapted to fit into the open top of the container to overlie and rest upon said ham, means for yieldably exerting a balanced pressure upon the cover so as to compress the ham beneath it, and a liquid-tight seal around the periphery of the cover and adapted to permit uniform movement of the periphery of said cover under the action of said pressure means and of the internal pressure, whereby the ham is retained under pressure during the boiling and shrinkage thereof, while the ham juices are prevented from escaping during immersion of the boiler in a boiling medium when the pressure within the mold is not sufficient to distort said seal.

3. In a ham boiler a container having a base and upstanding side walls and adapted to accommodate a ham to be boiled and compressed, a vertically moving horizontal cover of substantial extent adapted to fit into the open top of the container to overlie and rest upon said ham, means for yieldably exerting a balanced pressure upon the cover so as to compress the ham beneath it, and a sealing ring of resilient material mounted around the periphery of the cover and adapted to permit uniform movement of the periphery of the cover under the action of said pressure means and of the internal pressure, whereby the ham is retained under pressure during the boiling and shrinkage thereof while the ham juices are prevented from escaping during immersion of the boiler in a boiling medium when the pressure within the mold is not sufficient to distort said sealing ring.

4. In a ham boiler, a substantially rectangular container having a base and upstanding side walls, two opposite side walls being provided with rack teeth, the container being adapted to accommodate a ham to be boiled and compressed into substantially rectangular form, a yoke applicable to the container and provided with hooks adapted to engage with said rack teeth to hold the yoke against withdrawal, a cover adapted to fit relatively loosely into the open top of the container to overlie and rest upon the ham in said container, elliptical springs of uniform cross-section between the yoke and cover, said springs being dimensioned and positioned relatively to the cover so that the major axes of the elliptical coils thereof extend transversely of the cover and over a substantial portion of the width thereof, whereby they exert a balanced pressure on the cover relatively to its longitudinal axis, and a sealing ring of resilient material mounted on the periphery of the cover and slidably engaging the side walls of the container, said ring being inwardly tapered, said ring permitting movement of the cover under the action of said springs, whereby the ham is retained under pressure while the juices are prevented from escaping from the container when the pressure is not too great.

5. In a ham boiler a container having a base and upstanding side walls and adapted to accommodate a ham to be boiled and compressed, a cover adapted to fit into the open top of the container to overlie and rest upon said ham, means for yieldably exerting a balanced pressure upon the cover so as to compress the ham beneath it, and a liquid-tight seal around the periphery of the cover and adapted to permit uniform movement of the cover under the action of said pressure means and of the internal pressure, whereby the ham is retained under pressure during the boiling and shrinkage thereof, while the ham juices are prevented from escaping during immersion of the boiler in a boiling medium, said seal also being adapted to yield when the internal pressure exceeds a predetermined amount so as to allow the escape of internal gases and liquids and reduce the pressure to said predetermined amount.

6. An apparatus for processing and molding meat, comprising a mold adapted to contain the meat to be treated, a follower member movable within said mold, means for exerting pressure upon said follower member, and means carried by said follower member and coacting with said mold effectively to seal said mold against ingress of extraneous matter and to permit escape of the juices extruded from the meat during the treatment thereof when the pressure within said mold has reached a predetermined limit.

7. An apparatus for processing and molding meat, comprising a mold adapted to contain the meat to be processed and molded, a follower member movable within said mold, means for applying following pressure to said follower member, and a flexible, resilient sealing member intermediate the walls of said mold and the periphery of said follower member and carried thereby effectively to seal said mold against ingress of extraneous matter and to permit escape from said mold of some of the juices extruded from said meat during the treatment thereof when the pressure within said mold is sufficient to distort said sealing member.

8. An apparatus for processing and molding meat, comprising a mold adapted to contain the meat to be processed and molded, a follower member movable within said mold, means for applying following pressure to said follower member, a flexible, resilient sealing member intermediate the walls of said mold and the periphery of said follower member and carried thereby, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member.

9. An apparatus for processing and molding meat, comprising a mold adapted to contain the meat to be processed and molded, a follower member movable within said mold, means for applying following pressure to said follower member, a flexible, resilient sealing member carried by the periphery of said follower member, effectively to seal said mold against ingress of extraneous matter and to permit escape from said mold of some of the juices extruded from said meat during the treatment thereof when the pressure within said mold is sufficient to distort said sealing member, and means for supporting and reinforcing said flexible, resilient sealing member.

10. In an apparatus for processing and molding meat having a mold, a follower, and resilient means for maintaining the follower in positive engagement with the meat in the mold, said follower having a sealing means adapted to coact with the walls of said mold to permit egress of liquid from said mold when the pressure in said mold has reached a predetermined limit and to prevent ingress of extraneous matter into said mold.

HANS ADELMANN.